Feb. 8, 1966 A. I. BENSON ET AL 3,233,471
POWER TAKE-OFF CONNECTION
Filed May 6, 1963 2 Sheets-Sheet 2
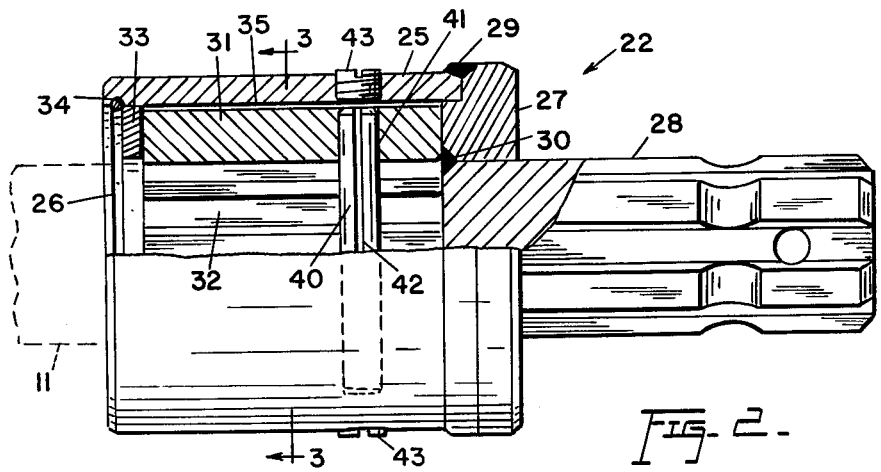
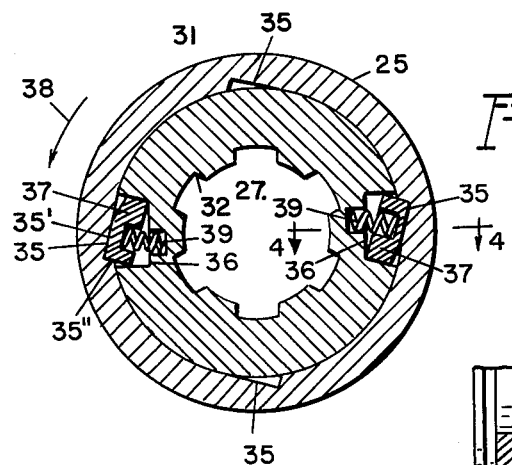
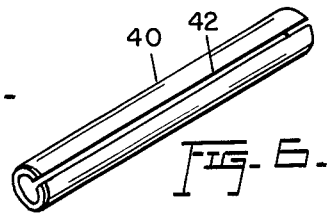
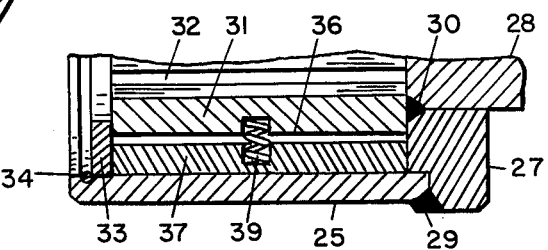
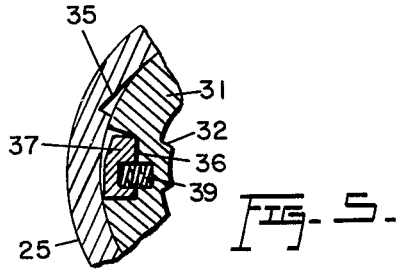
INVENTORS
A. I. BENSON
B. L. CRIM
BY Munson H. Lane
ATTORNEY United States Patent Office 3,233,471
Patented Feb. 8, 1966

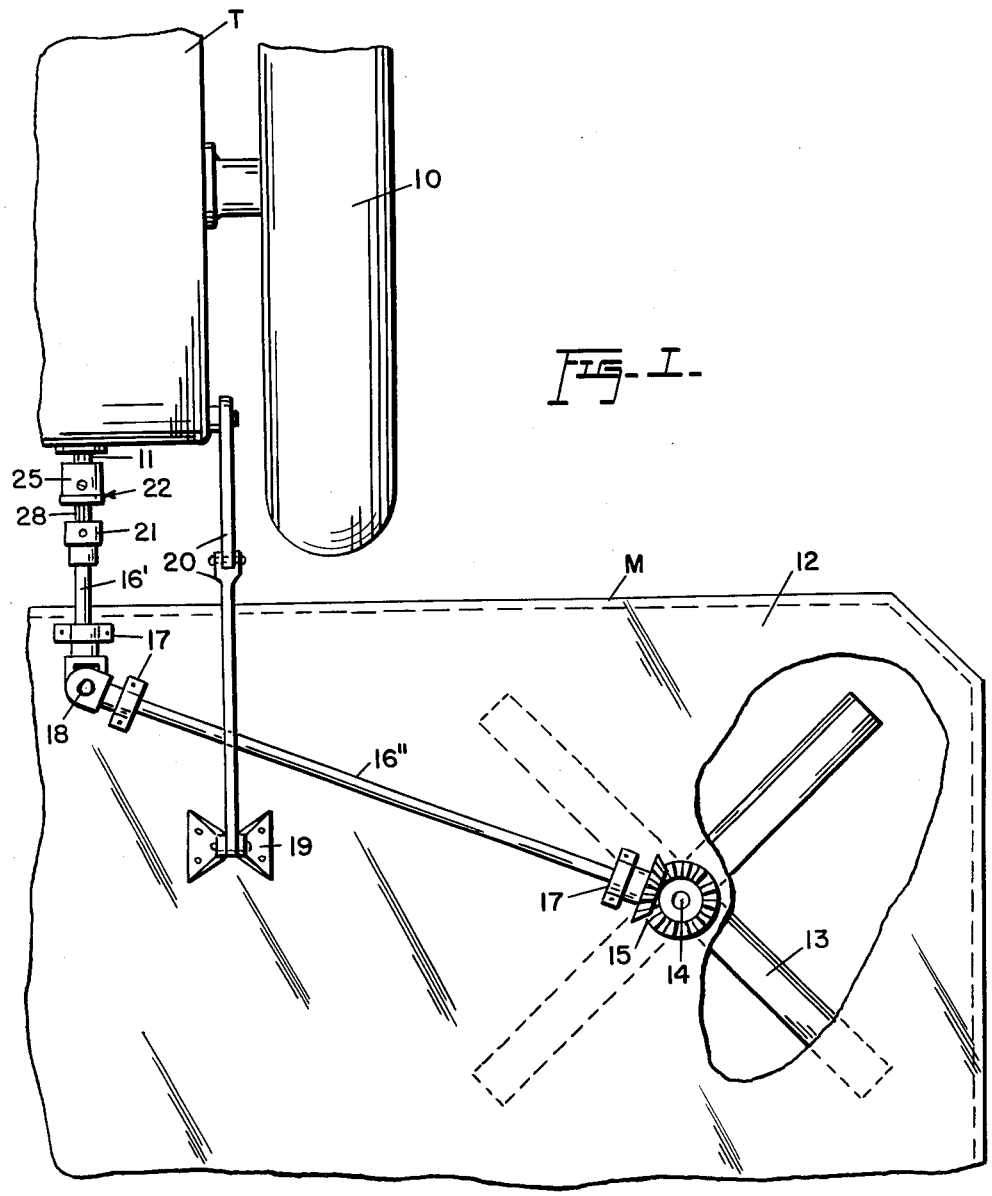

3,233,471
POWER TAKE-OFF CONNECTION
Alvin I. Benson and Bernard L. Crim, Henderson, Tex., assignors to Patent & Development, Incorporated, Raleigh, N.C.
Filed May 6, 1963, Ser. No. 277,990
2 Claims. (Cl. 74—11)

This invention relates to new and useful improvements in operative connections between the power take-off of a tractor and an implement actuated by the power take-off, as for example, a mowing machine, a combine, a cultivator, or similar other power driven implement.

In conventional practice it is customary to connect the drive shaft of the implement directly to the power take-off shaft of the tractor, the power take-off shaft usually being splined and an internally splined adapter being usually provided on the drive shaft of the implement for operative connection to the power take-off shaft. While this arrangement is generally satisfactory, some difficulties are encountered with certain types of implements, for example, mowing machines which utilize rotary cutting blades. Such blades are rotated at high speed and since they are quite heavy they attain a considerable amount of inertia or momentum which causes them to continue rotation even when the tractor is stopped. Such continued rotation of the cutting blades is transmitted by their drive shaft to the power take-off shaft of the tractor and forces the tractor to move along the ground even when the tractor engine is de-clutched from the driving wheels and brakes are applied. As a result, the tractor travels several feet beyond the point where it was intended to be stopped and, if some obstruction happens to be in the way, collision or other damage frequently occurs.

It is, therefore, the principal object of the invention to provide an improved operative connection between the power take-off shaft of a tractor and the drive shaft of an implement which serves as an over-running clutch capable of transmitting torque only from the power take-off shaft to the drive shaft while preventing transmission of torque in the relatively opposite direction, so that the tractor may be dependably stopped at a desired point without being propelled further by continued rotation of the drive shaft.

The invention has the advantage of being able to be interposed between the tractor power take-off shaft and the implement drive shaft without any structural modification of either the tractor or the implement. Also, it is simple in construction, durable, and adaptable to convenient and economical manufacture.

With the foregoing more important objects and features in view, and such other objects and features as may become apparent as this specification proceeds, the invention will be understood from the following description taken in conjunction with the accompanying drawings, wherein like characters of reference are used to designate like parts, and wherein:

FIG. 1 is a fragmentary plan view, showing a portion of a tractor, a portion of a rotary mowing machine, and the operative connection of the invention between the power take-off shaft of the tractor and the drive shaft of the mowing machine;

FIG. 2 is an enlarged view, partly in section and partly in elevation, of the operative connection per se;

FIG. 3 is a cross-sectional view, taken substantially in the plane of the line 3—3 in FIG. 2;

FIG. 4 is a fragmentary longitudinal sectional view, taken substantially in the plane of the line 4—4 in FIG. 3;

FIG. 5 is a fragmentary cross-sectional view, similar to that shown in FIG. 3 but illustrating the operative connection in a non-driving position; and FIG. 6 is a perspective view of a spring pin used in the invention.

Referring now to the accompanying drawings in detail, the reference character T designates a conventional tractor having driving wheels 10 and the usual splined power take-off shaft 11. The character M designates, for example, a rotary mowing machine including a frame or body 12 supporting a rotary cutting blade unit 13 which is secured to a shaft 14. The latter is operatively connected by gearing 15 to an articulated drive shaft 16', 16", journalled in bearings 17 on the frame 12, the two sections of the drive shaft being connected together by a universal joint 18. It is to be understood that the particular construction of the machine M is conventional and constitutes no part of the present invention. Thus, the structure as shown and described is for illustrative purposes only and any conventional machine or implement may be utilized. The same comment is also applicable to the connection of the machine frame 12 to the tractor T. For illustrative purposes the machine frame is shown as being attached by suitable brackets 19 to the usual power lift arms 20 of the tractor, but alternatively, the machine may be connected to the tractor draw bar (not shown) if so desired.

In any event, the drive shaft section 16' of the machine M is usually provided with an internally splined adapter 21 which, in accordance with conventional practice, is coupled directly to the splined power take-off shaft 11 for imparting rotation to the cutting blade unit 13. However, in accordance with the invention an operative connection in the form of an over-running clutch assembly 22 is interposed between the power take-off shaft 11 and the splined adapter 21. The arrangement of the clutch 22 is such that torque can be transmitted only from the power take-off shaft 11 to the drive shaft 16', 16" for driving the blade unit 13, while transmission of torque in the relatively opposite direction is impossible. Thus, when the tractor is stopped continued rotation of the blade unit 13 by inertia cannot cause propulsion of the tractor.

FIGS. 2–5 illustrate the clutch assembly 22 in detail and it will be noted that the same comprises a cylindrical housing 25 having an open end 26 and a closed end 27. A splined shaft 28 is provided externally on the closed end 27 in coaxial relation with the housing 25. The components 25, 27 and 28 are rotatable as a unit and may be machined integrally from one piece of material, although to facilitate fabrication it is preferable to make them separately and secure them together, as by the welding 29 and 30.

The housing 25 accommodates therein a rotatable sleeve 31 which is internally splined as at 32 and is removably retained in the housing by a keeper washer 33 and a snap ring 34 in the open end portion 26 of the housing.

The inner surface of the housing is provided with a plurality of circumferentially spaced, longitudinally extending grooves 35, each of which has a cam surface 35' and an abutment edge 35".

The outer surface of the sleeve 31 is provided with a plurality of circumferentially spaced, longitudinally extending channels 36, each containing an elongated driving key 37. It will be noted that in cross-section, the keys 37, the channels 36 and the grooves 35 are so configurated that when the channels 36 are in substantial alignment with the grooves 35, the keys 37 may project outwardly from the channels into the grooves and abut the edges 35" of the grooves as shown in FIG. 3, so that if rotation is imparted to the sleeve 31 in the direction of the arrow 38, the housing 25 will be rotated in the same direction by the driving keys. However, if rotation should be imparted to the housing 25 in the direction of the arrow 38, the cam surfaces 35′ of the grooves 35 will cause the keys 37 to retract into the channels 36 as shown in FIG. 5, so that such rotation of the housing will not be transmitted to the sleeve 31.

Suitable compression springs 39 are interposed between the sleeve 31 and the keys 37 to urge the keys outwardly, such springs being seated in suitable sockets formed in the keys and in the bottom of the channels 36, as illustrated. The number of driving keys may or may not match the number of the grooves 35, as desired.

The internally splined sleeve 31 is intended to receive therein the splined power take-off shaft 11 of the tractor, which shaft is inserted into the sleeve through the open end 26 of the housing 25. The sleeve 31 is thus rotatable with the power take-off shaft by the interfitting splines, but means are provided for preventing the assembly 22 from sliding axially off the shaft 11. These means comprise a spring pin 40 which is inserted in diametrically aligned bores 41 formed in the sleeve 31 and passes through a transverse aperture (not shown) in the power take-off shaft. The pin 40 is formed from resilient metal stock which is arcuated so that the pin has an open-ended tubular form with a longitudinal slit 42, as is best shown in FIG. 6. The length of the pin is such that it does not project beyond the periphery of the sleeve 31 to jam in the grooves 35 of the housing 25, and the inherent resiliency of the pin causes it to frictionally retain itself in the sleeve bores 41 to prevent the pin from longitudinal shifting, that is, shifting in the direction of its own axis. The housing 25 is provided with a pair of diametrically opposite screw-threaded bores receiving a pair of screw-threaded plugs 43 therein, the bores for these plugs being so positioned that they may be aligned with the bores 41 in the sleeve 31 to faciiltate installation and removal of the pin 40 when the plugs 43 are removed.

The splined shaft 28 of the clutch assembly is intended to be received in the conventional, internally splined adapter 21 of the machine drive shaft section 16′, so that a one-way driving connection is provided from the power take-off shaft 11 to the drive shaft 16′, 16″ and to the rotary blade unit 13, but transmission of torque in the relatively opposite direction, that is, from the blade unit to the power take-off shaft, is impossible, since even if the unit 13 keeps rotating after the traveling movement of the tractor is stopped the housing 25 will simply rotate on the sleeve 31 without transmitting torque to the latter.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. For use with a tractor having a splined power take-off shaft of a given diameter for normally receiving a conventional internally splined drive adapter of the same diameter, an implement connected to said tractor and including a rotary work engaging member, and a drive shaft for rotating said member, and an internally splined drive adapter provided on said drive shaft, said adapter having substantially the same diameter as and being normally connectable to said power take-off shaft; a one-way drive connection adapted to be interposed between the power take-off shaft and said drive adapter, said one-way drive connection comprising a clutch including a cylindrical housing having a closed end and an open end, an internally splined sleeve rotatably positioned in said housing and having substantially the same inside diameter as said internally splined drive adapter, said power take-off shaft being adapted to extend through the open end of said housing into said sleeve, means interposed between said sleeve and said housing for transmitting rotation in one direction only from the sleeve to the housing and a splined shaft member provided externally on the closed end of the housing in coaxial relation therewith, said splined shaft member being of substantially the same diameter as said splined power take-off shaft and adapted to extend into said splined adapter on said drive shaft together with a keeper pin extending transversely through said sleeve and through said power take-off shaft to prevent axial shifting of the sleeve on the power take-off shaft.

2. A one-way drive connection as defined in claim 1 together with a pair of removable plugs provided at diametrically opposite sides of said housing for alignment with said removable keeper pin.

References Cited by the Examiner

UNITED STATES PATENTS

| | | | |
|---|---|---|---|
| 677,592 | 7/1901 | Patrick | 192—46 |
| 1,359,321 | 11/1920 | Brown | 287—52.08 |
| 1,911,373 | 5/1933 | Lindgren | 74—15.6 X |
| 2,248,332 | 7/1941 | Budelier | 74—15.6 X |
| 2,340,368 | 2/1944 | Dodge | 192—46 X |
| 2,366,912 | 1/1945 | Lauper | 192—46 X |
| 2,458,991 | 1/1949 | Grosshart | 74—15.6 X |
| 2,648,247 | 8/1953 | Schmuziger | 287—52.08 |
| 2,764,921 | 10/1956 | Johnson | 172—103 X |
| 2,877,616 | 3/1959 | Gewalt et al. | 56—25.4 |
| 2,883,866 | 4/1959 | Harkleroad | 74—11 |
| 3,043,082 | 7/1962 | Northcote et al. | 56—25.4 |

FOREIGN PATENTS 23,621   1900   Great Britain.

BROUGHTON G. DURHAM, *Primary Examiner.*

MILTON KAUFMAN, *Examiner.*